United States Patent
Brown

(10) Patent No.: US 6,193,289 B1
(45) Date of Patent: Feb. 27, 2001

(54) BARBEQUE TURNER

(76) Inventor: Sean Brown, 2400 State Hwy. 121, Apt. 2702, Euless, TX (US) 76039

( * ) Notice: Subject to any disclaimer, the term of this patent is extended or adjusted under 35 U.S.C. 154(b) by 0 days.

(21) Appl. No.: 09/558,744

(22) Filed: Apr. 21, 2000

(51) Int. Cl.$^7$ .................................................. A47J 43/28
(52) U.S. Cl. ............................................................. 294/8
(58) Field of Search ......................... 294/7, 8, 32, 49, 294/53, 5; 30/124, 324, 500; 99/394, 395, 397, 421 A, 424

(56) References Cited

U.S. PATENT DOCUMENTS

| | | |
|---|---|---|
| 450,536 | 4/1891 | Stephens . |
| 557,092 | 3/1896 | Cobb . |
| 614,016 | 11/1898 | MacDuffee . |
| 681,662 | 8/1901 | Tomaskoff . |
| 815,781 | 3/1906 | Banks . |
| 1,214,522 | 2/1917 | Eckert . |
| 1,553,289 | 9/1925 | Giannico . |
| 1,575,275 | 3/1926 | Pearson . |
| 1,897,999 | 2/1933 | Brokuist et al. . |
| 2,033,635 | 3/1936 | Imschweiler . |

*Primary Examiner*—Johnny D. Cherry
(74) *Attorney, Agent, or Firm*—Lawrence I. Fleishman

(57) ABSTRACT

Disclosed is a Barbeque Turner with a plate, an armature and a handle. Food, which is engaged by the plate, is turned by the pull of a trigger which actuates gears within the handle which, in turn, rotate that armature and the plate which is attached thereto.

3 Claims, 2 Drawing Sheets

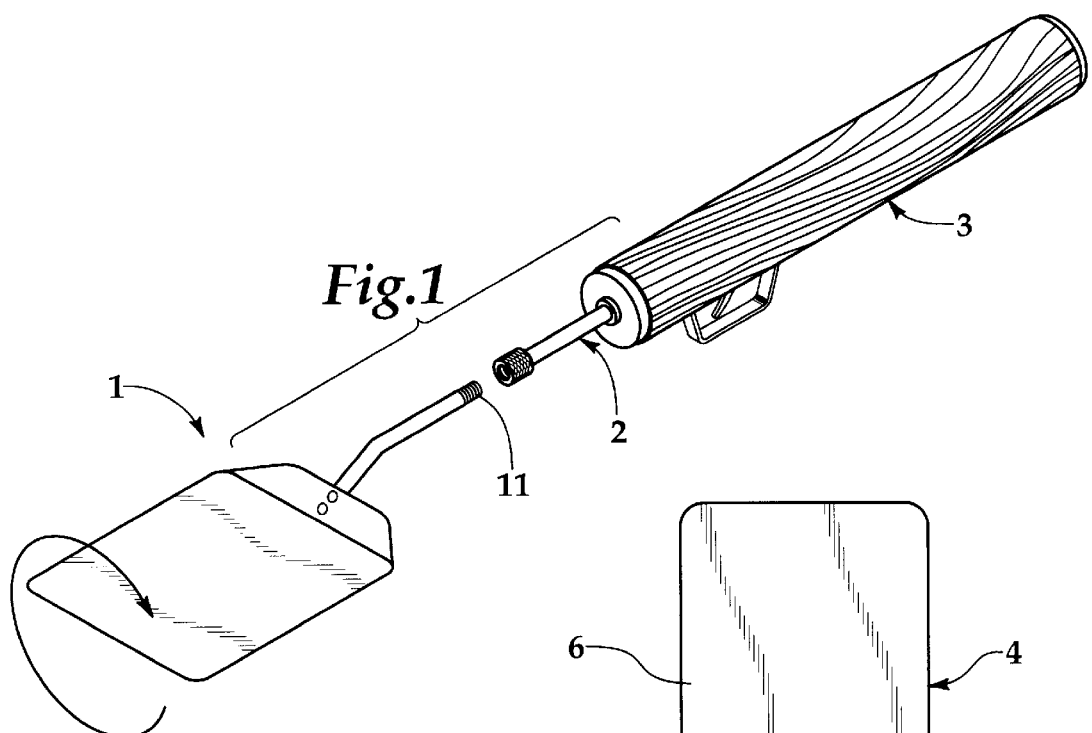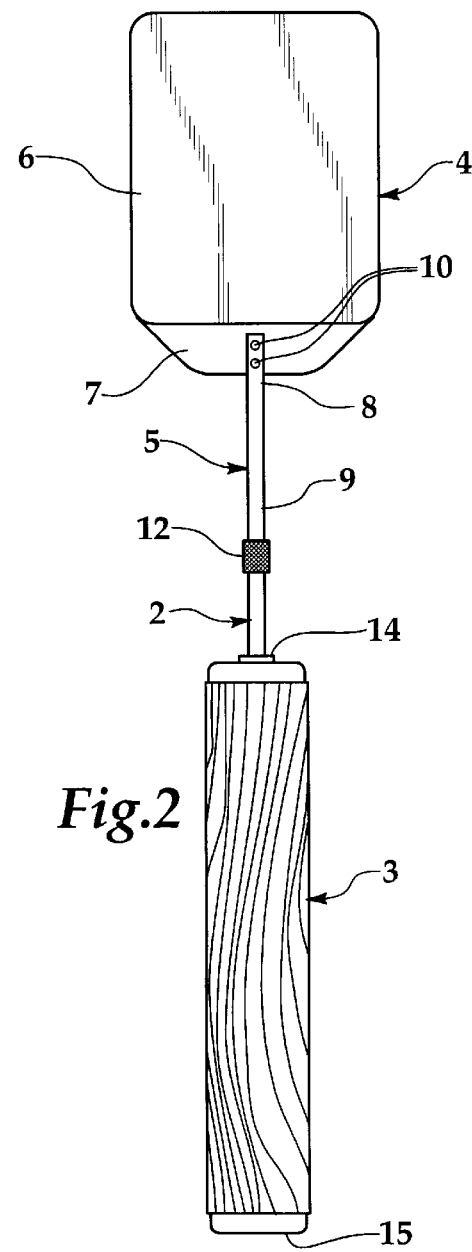

BARBEQUE TURNER

CROSS REFERENCES TO RELATED APPLICATIONS

None

STATEMENTS AS TO RIGHTS TO INVENTIONS MADE UNDER FEDERALLY SPONSORED RESEARCH AND DEVELOPMENT

None

BACKGROUND OF THE INVENTION

1. Field of the Invention

This invention relates generally to a device for turning over items that are being cooked. More particularly, this invention comprises a device that turns over items that are being barbequed or grilled.

2. Description of the Related Art

People who grill or barbeque food use manual devices, such as spatulas and forks, to turn the food that is being cooked. This is especially inconvenient when cooking with the newer barbeque ovens which have multiple, closely spaced cooking grids because there is not enough room to turn the food by hand. Around the turn of the century, there were several inventions that allowed food to be turned with a mechanical device. However, these inventions have their mechanisms open to the outside and are not well suited to modern safety standards, manufacturing or fabrication techniques. Therefore, it is desirable to have a simple, closed device that turns over the food being cooked that can easily be manufactured by modern techniques with modern materials.

SUMMARY OF THE INVENTION

The object of the current invention is to provide a device that can be used to turn over items that are being barbequed or cooked. The current invention provides such a device with a mechanically activated rotation mechanism.

The invention comprises a handle, an armature and a plate. The handle contains a set of three gears, an external trigger and most of the armature. The user places the plate under the object to be turned and presses the trigger. The action of the trigger, through the gears, rotates the plate through 180 degrees and flips the object. A spring flips the plate back to the original position. The plate is removably fixed to the armature outside of the handle to facilitate changes in plates for different applications. The advantages of the invention are that the mechanism is closed and the user can flip the food in a narrow space because he need not turn his wrist when actuating the devise.

BRIEF DESCRIPTION OF THE DRAWINGS

FIG. 1 is an isometric view of the invention.

FIG. 2 is a top view of the invention.

DESCRIPTION OF THE PREFERRED EMBODIMENT

Figures 3, 4:
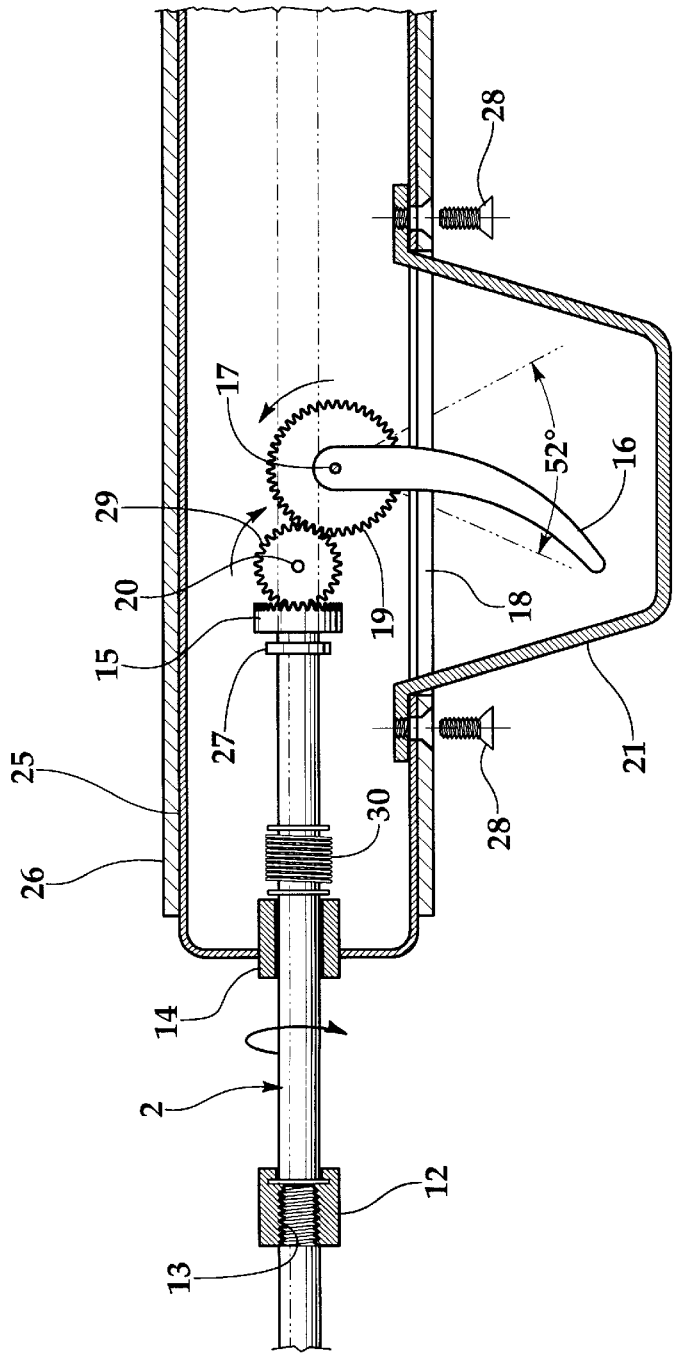
FIG. 3 is a side cross section of the handle of the invention.
FIG. 4 is a front cross sectional view of the gears for an alternate preferred embodiment.

The preferred embodiment of the invention is best understood by referring to the drawings. As shown in FIG. 1 the present invention is comprised of a plate 1, an armature 2, and a handle 3.

Referring further to FIG. 2, the plate 1 consists of a plate 4 and a rod 5. The forward portion 6 of the plate 4 is horizontal when in use and the rearward portion 7 of the plate is bent upward from the horizontal. Although the plate as illustrated is in the form of a spatula, other forms, such as a fork, may be used. The rod 5 has a front portion 8 that extends from and in the same plane as the rearward portion 7 of the plate 4 and a rear portion 9 that bends back toward the horizontal and lies in the same plane as the forward portion 6 of the plate 4. The rod 5 is typically attached to the plate 1 with rivets 10. The rear portion 9 of the rod 5 is threaded 11 to allow other plates, such as a fork, to be attached to the armature 2. The armature 2 passes through a front bearing 14 and a rear bearing 15 that are disposed in opposite ends of the handle 3.

Referring further to FIG. 3, the handle 3 is comprised of an inner sleeve 25 and an outer sleeve 26. The inner sleeve can be metal, plastic or any other material that is convenient to fabricate, sufficiently strong and can withstand the heat. In the preferred embodiment of the invention, metal is used. The outer sleeve must be thermally insulating and able to withstand heat. Wood is used in the preferred invention.

The front portion of the armature 2 has a sleeve 12 which is threaded 13 to engage the rear portion 9 of the rod 5. The armature is further stabilized by a mounting bracket 27 within the handle 3. A crown pinion gear 15 is attached to the portion of the armature 2 that is within the handle 3.

A trigger 16 is attached to a trigger shaft 17 which is disposed in the handle 3 so as to be perpendicular to the armature 2. The trigger 16, which is attached to the trigger shaft 17, extends through an opening 18 in the handle 3. A trigger guard 21 is mechanically attached with bolts 28 to the handle 3 in the vicinity of the trigger 16 and the opening 18 in the handle 3.

A trigger spur gear 19 is also attached to the trigger shaft 17. A transfer spur gear 29 is attached to a transfer shaft 20 that is disposed in the handle 3 so as to be parallel to the trigger shaft 17. The trigger shaft 17, trigger spur gear 19, transfer shaft 20, and transfer spur gear 29 are all positioned relative to one another and the armature 2 and crown pinion gear 15 so the gears mesh as shown in FIG. 3. The number of teeth in each gear and the respective gear ratios are such that a squeeze of the trigger rotates the plate through approximately 180 degrees.

While there are many trigger displacements, gear ratios and gear sizes that will accomplish this, the preferred embodiment uses a trigger displacement of 52 degrees, a 11/16" diameter pinion gear with 34 teeth, a 3/8" diameter spur gear with 20 teeth and a 5/16" diameter crown gear with 10 teeth. The gears can be made of plastic, nylon, metal or any other convenient material that will withstand the heat.

When the trigger 16 is released, the plate 4, is returned to its original position by a rotary spring 30 that is fixed between the armature 2 and the handle 3.

In a second embodiment of the invention, as shown in FIGS. 1, 2 and 3 as modified by FIG. 4, a trigger bevel gear 22 is attached to a trigger shaft 17, a transfer bevel gear 23 is attached to the transfer shaft 20 and a bevel pinion gear 24 is attached to the armature 2. In this embodiment, the shafts may be oblique to one another if the bevel gears are hypoid. The trigger shaft 17, trigger bevel gear 22, transfer shaft 20, and transfer bevel gear 23 are all positioned relative to one another and the armature 2 and bevel pinion gear 24 so the gears mesh as shown in FIG. 4. While there are many trigger displacements, gear ratios and gear sizes that will accomplish this, the preferred embodiment uses a trigger displacement of 52 degrees, a ¹¹⁄₁₆" diameter pinion gear with 34 teeth, a ⅜" diameter spur gear with 20 teeth and a ⁵⁄₁₆" diameter crown gear with 10 teeth.

What is claimed is:

1. A Barbeque Turner comprising:
   a. an armature rotatably disposed through a handle,
   b. a trigger shaft disposed within said handle,
   c. a trigger attached to said trigger shaft and extending through an opening in said handle,
   d. a trigger bevel gear disposed on said trigger shaft,
   e. a transfer shaft disposed in said handle,
   f. a transfer bevel gear attached to said transfer shaft,
   g. a bevel pinion gear attached to said armature,
   h. said shafts being disposed within said handle and said gears being attached to said shafts so a displacement of said trigger causes the rotation of said trigger bevel gear which causes a rotation of said transfer bevel gear which causes a rotation of said bevel pinion gear and said armature, and
   i. a plate attached to a portion of said armature that extends outside of said handle.

2. The Barbeque Turner in claim 1 wherein
   a. said trigger shaft is perpendicular to said armature, and
   b. said transfer shaft is parallel to said trigger shaft.

3. The Barbeque Turner in claim 2 wherein
   a. said bevel pinion gear is a crown pinion gear,
   b. said transfer bevel gear is a transfer spur gear, and
   c. said trigger bevel gear is a trigger spur gear.

* * * * *